July 7, 1931. R. J. KENT 1,812,961
CABLE GUIDE
Filed April 30, 1929
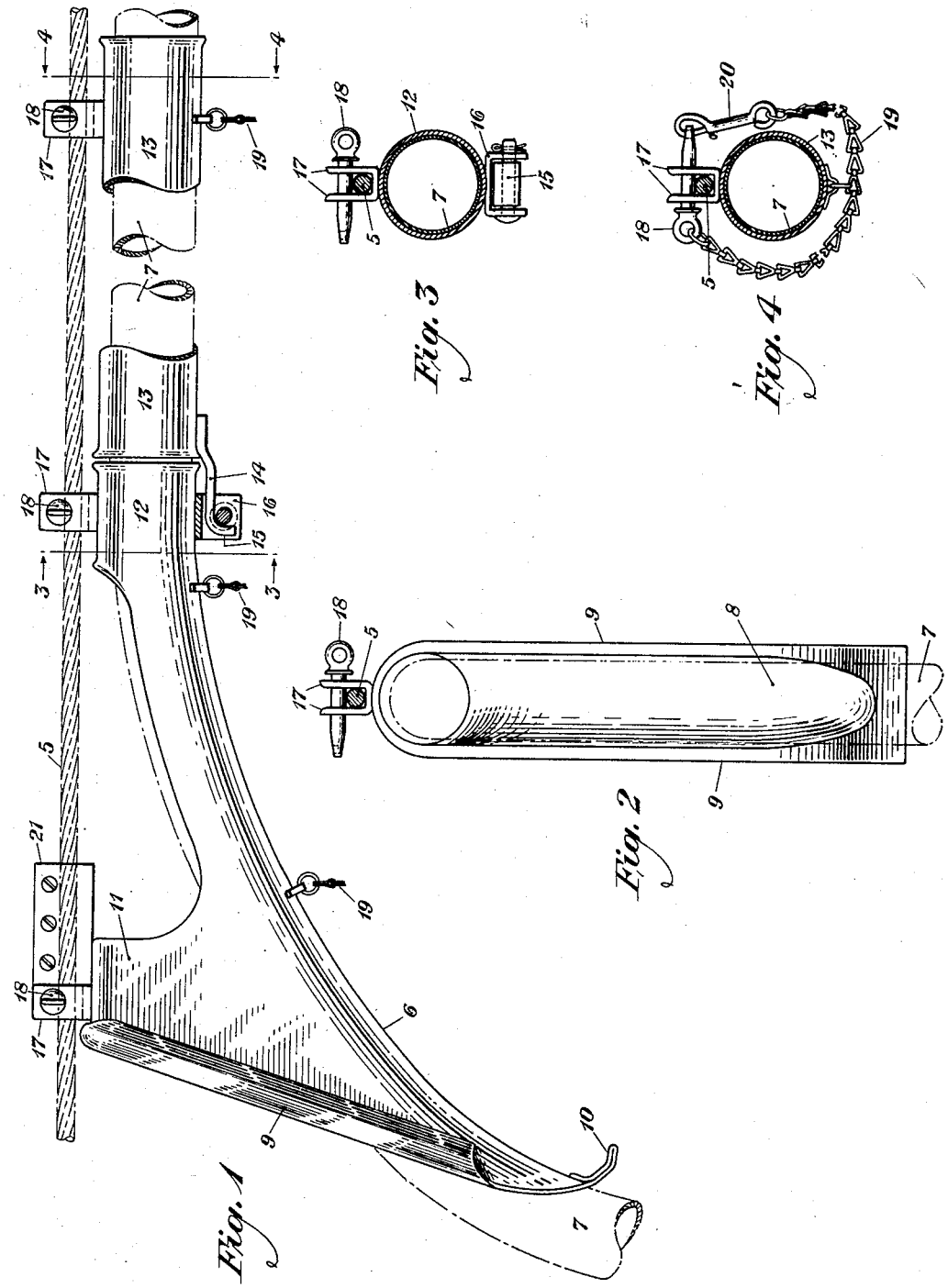
INVENTOR
*R. J. Kent*
BY
ATTORNEY Patented July 7, 1931

1,812,961

UNITED STATES PATENT OFFICE

ROBERT J. KENT, OF JAMAICA, NEW YORK, ASSIGNOR TO AMERICAN TELEPHONE AND TELEGRAPH COMPANY, A CORPORATION OF NEW YORK

CABLE GUIDE

Application filed April 30, 1929. Serial No. 359,305.

This invention relates to cable guides, and more particularly to devices of this character which are adapted for use in connection with the installation of cables for supporting and guiding them in their passage from cable reels to aerial messenger wires, upon which they may be supported by means of rings or the like.

One of the objects of this invention is to provide a simpler and more expeditious method of placing an aerial cable in position upon a messenger wire with decreased liability of injury to the cable than heretofore.

Another object consists in the elimination of bows from cables during their installation.

Another object consists in effecting such cable-placing operation without the necessity of employing heavy, massive, complicated or non-portable apparatus.

The novel features which are considered characteristic of this invention are set forth with particularity in the appended claim. The invention, both as to its organization and method of operation, together with other objects and advantages thereof, will be further explained in the following detailed description having reference to the accompanying drawings consisting of the following figures:

Figure 1 is a side elevation of the improved guide showing it in position on a messenger wire;

Fig. 2 is an end view of Fig. 1;

Fig. 3 is a section taken on the line 3—3 of Fig. 1;

Fig. 4 is a section taken on the line 4—4 of Fig. 1.

In the drawings, the improved cable guide is shown as attached to a messenger wire 5. The guide, which is composed of steel or other suitable material, comprises a longitudinal end portion 6 for initially receiving a cable. The cable 7 is drawn from a cable reel and passes over the portion 6 and other portions of the cable guide to be later described, thence through cable rings supported by the messenger wire. The portion 6 is curved, and provided with a semi-crcular channel member 8 of substantially U-shaped cross-section into which the cable is introduced. The curvature of the portion 6 is of sufficient radius to permit the cable to be drawn over the surface of the channel member 8 without undue bending of the cable. The portion 6 is provided with overturned flanges 9 which are positioned on each side of the channel member 8. These flanges are inclined as shown in Fig. 1 and extend from a point near the end of the member 6 to the top portion thereof. The overturned flanges provide rigidity for the portion 6, and their smooth surfaces prevent scoring or other injury to the sheaths of adjacent cables, should the cable guide contact therewith. An inwardly turned curved nose portion 10 is also provided at the end of the member 6 to prevent the end of the cable from catching as it is introduced into the channel member. The top part of the member 6 has a loop portion 11 which connects each side of the channel member 8. A tubular portion 12 is provided at the right end of the cable guide, and serves to guide and straighten the cable 7 as it is drawn therethrough into the horizontal position in which it is to be supported by the wire 5. The cut-away portion of the cable guide between the loop 11 and the tubular member 12 serves to lessen the weight of the guide, and also permits the cable to be observed in its passage through the guide at this point. The tubular member 12 is preferably flared at its vertical edges to avoid damage to the sheath of the cable as it travels through the guide. The flared edges also protect the sheaths of adjacent cables.

A tubular member 13 is pivotally secured to the tubular member 12, and this also has its vertical ends flared for the same reason as that stated in connection with like portions on the member 12. For the purpose of illustration, the hinged joint connection is shown in the drawings as consisting of a finger 14 which has a straight end welded or otherwise secured to the tubular member 13. The curved portion of the finger extends about a pin 15 secured to an inverted U-shaped bracket 16 carried by the tubular portion 12. This sort of a hinge enables the member 13 to be readily attached to and detached from the member 12 while the latter member is in position on the strand 5.

A clevis 17 may be provided at various points on the cable guide to support it on the strand 5. These may be welded to the cable guide or otherwise suitably attached thereto. The clevis members in the present instance are positioned on the tops of the loop portion 11 and the tubular portions 12 and 13. A pin 18 extends through openings in the forks of each clevis and one end of the pins has an opening therethrough to which a chain 19 is attached. The ends of the pins 18 which extend through the clevises are also provided with openings through which the loops of snap hooks 20 may be inserted to prevent displacement of the pin 17. The chains 19 may be attached to the various portions of the cable guide by means of rings which engage loops secured to the under side of said guide. These chains thus prevent the detachment of the pins and snap hooks from the cable guide.

A clamp 21 is secured to the messenger wire 5 to prevent longitudinal movement of the cable guide in the operation of installing a cable. This clamp may be integral with any one of the clevises or may be separated therefrom and attached to the messenger wire independently. In the latter case it may be of any well known form; for instance, it may be composed of parallel plates having adjacent longitudinal grooves which fit about the strand, and said plates may be secured together by means of bolts to clamp the messenger wire between them.

The cable guide above described may be readily attached to and detached from the messenger wire. In the operation of installing a cable on the messenger wire, a line is attached to the end of the cable and then drawn over the curved channel portion of the guide and through the tubular portions thereof. The nose portion on the end of the improved cable guide prevents the end of the cable from catching as it is about to enter the channel portion. When the line is pulled through the guide it pulls the cable with it. The tubular portions of the guide tend to eliminate bends and straighten the cable into a horizontal position as it leaves the guide. The cable may be then drawn through successive rings attached to the messenger wire in spaced relation, and supported by such rings in the horizontal position it is to occupy parallel to the messenger strand.

From the foregoing it is thought that the construction, operation and many advantages of the herein described and delineated invention will be apparent to those skilled in the art without further description, and it will be understood that various changes in the size, shape, proportion and minor details of construction may be resorted to without departing from the spirit or sacrificing any of the advantages of the invention as defined in the appended claim.

What is claimed is:

An aerial guide for cables adapted to be mounted on a messenger wire, a curved member of substantially U-shaped cross-section for initially receiving the cable, a nose member at one end of the channel member for preventing interference to the entrance of the end of a cable into the channel member, a tubular portion connected to the channel member, a straightener hinged to the tubular member and cooperating therewith in guiding the cable in a direction parallel to the messenger wire while the cable is being installed thereon, and means for supporting the guide on the messenger wire.

In testimony whereof, I have signed my name to this specification this 29th day of April, 1929.

ROBERT J. KENT.